(12) United States Patent
Ono et al.

(10) Patent No.: US 9,237,269 B2
(45) Date of Patent: Jan. 12, 2016

(54) IMAGE PROCESSING DEVICE, IMAGE PROCESSING METHOD, AND COMPUTER PROGRAM PRODUCT

(71) Applicant: Kabushiki Kaisha Toshiba, Minato-ku (JP)

(72) Inventors: Toshiyuki Ono, Kanagawa (JP); Yasunori Taguchi, Kanagawa (JP); Takuma Yamamoto, Kanagawa (JP); Susumu Kubota, Tokyo (JP); Nobuyuki Matsumoto, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 111 days.

(21) Appl. No.: 13/937,478

(22) Filed: Jul. 9, 2013

(65) Prior Publication Data

US 2014/0016017 A1     Jan. 16, 2014

(30) Foreign Application Priority Data

Jul. 11, 2012   (JP) .................................. 2012-155834

(51) Int. Cl.
| | |
|---|---|
| *H04N 5/232* | (2006.01) |
| *H04N 13/02* | (2006.01) |
| *G06T 5/00* | (2006.01) |
| *G06T 5/50* | (2006.01) |

(52) U.S. Cl.
CPC ............ *H04N 5/23212* (2013.01); *G06T 5/002* (2013.01); *G06T 5/50* (2013.01); *H04N 13/0282* (2013.01); *G06T 2200/21* (2013.01); *G06T 2207/10052* (2013.01); *H04N 5/23232* (2013.01)

(58) Field of Classification Search
CPC ........... H04N 5/23212; H04N 5/23232; G06T 5/002; G06T 5/50; G06T 2207/10052; G06T 2200/21
See application file for complete search history.

(56) References Cited

U.S. PATENT DOCUMENTS

| | | | |
|---|---|---|---|
| 2008/0131019 A1* | 6/2008 | Ng ................................. | 382/255 |
| 2009/0295829 A1* | 12/2009 | Georgiev et al. .............. | 348/335 |
| 2010/0277629 A1* | 11/2010 | Tanaka .......................... | 348/280 |
| 2012/0069235 A1* | 3/2012 | Imai ......................... | 348/333.11 |
| 2012/0070069 A1 | 3/2012 | Taguchi et al. | |
| 2012/0294590 A1* | 11/2012 | Pitts et al. ....................... | 348/42 |
| 2012/0327259 A1* | 12/2012 | Tamura ...................... | 348/222.1 |
| 2013/0075585 A1* | 3/2013 | Kobayashi et al. ......... | 250/208.1 |

FOREIGN PATENT DOCUMENTS

| | | |
|---|---|---|
| JP | 2007-4471 | 1/2007 |
| JP | 2011-22796 | 2/2011 |
| JP | 2013-178684 A | 9/2013 |

OTHER PUBLICATIONS

Office Action issued on Jun. 24, 2014, in Japanese Patent Application No. 2012-155834 with English translation.

* cited by examiner

*Primary Examiner* — Jason Flohre
(74) *Attorney, Agent, or Firm* — Oblon, McClelland, Maier & Neustadt, L.L.P.

(57) ABSTRACT

According to an embodiment, an image processing device includes a generator and a processor. The generator is configured to generate, from a plurality of unit images in which points on an object are imaged by an imaging unit at different positions according to distances between the imaging unit and the positions of the points on the object, a refocused image focused at a predetermined distance. The processor is configured to perform blurring processing on each pixel of the refocused image according to an intensity corresponding to a focusing degree of the pixel of the refocused image.

17 Claims, 8 Drawing Sheets

IMAGE PROCESSING DEVICE, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2012-155834, filed on Jul. 11, 2012; the entire contents of which are incorporated herein by reference.

FIELD

Embodiments described herein relate generally to an image processing device, an image processing method, and a computer program product.

BACKGROUND

There are known a light-field camera including a microlens array, camera array, or the like that simultaneously captures a plurality of images of the same object. In each of the images, a slightly different part of the same object, which is slightly shifted from each other, is shown. Thus, it is possible to reconstruct an image focused at any distance designated for the image by shifting and superimposing the plurality of images. Such reconstructed image is referred to as a refocused image.

In the conventional technology, however, there is a problem that variation in pixel values between the superimposed images is large in a region in which non-focused object is imaged, and thus, artifact of a false image shape occurs in the refocused image.

DETAILED DESCRIPTION

According to an embodiment, an image processing device includes a generator and a processor. The generator is configured to generate, from a plurality of unit images in which points on an object are imaged by an imaging unit at different positions according to distances between the imaging unit and the positions of the points on the object, a refocused image focused at a predetermined distance. The processor is configured to perform blurring processing on each pixel of the refocused image according to an intensity corresponding to a focusing degree of the pixel of the refocused image.

First Embodiment

Figure 1:
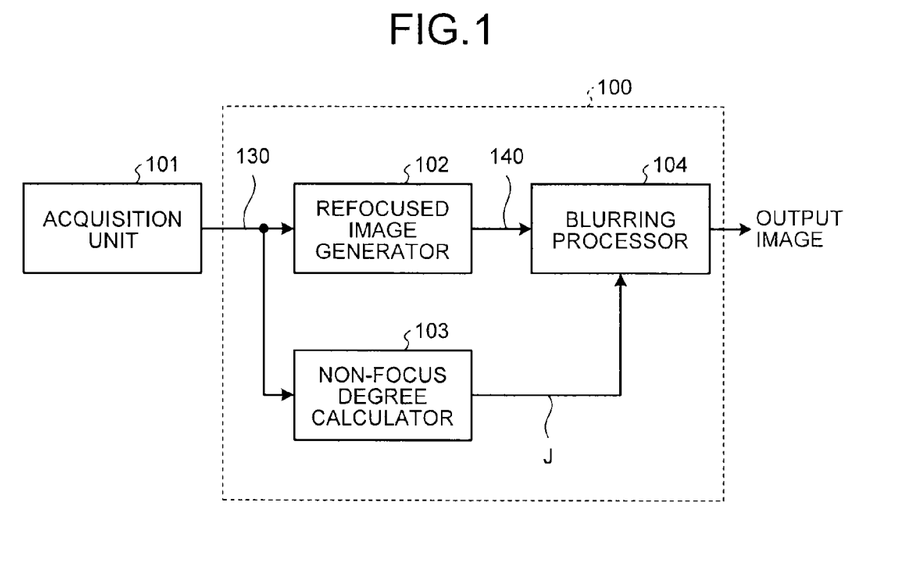
FIG. 1 is a block diagram illustrating an example of the configuration of an image processing device according to a first embodiment.

Hereinafter, an image processing device according to the first embodiment will be described. FIG. 1 is a diagram illustrating an example of the configuration of an image processing device 100 according to the first embodiment. The image processing device 100 performs a process on an image acquired by an acquisition unit 101 according to the first embodiment. The image processing device 100 includes a refocused image generator 102, a non-focus degree calculator 103, and a blurring processor 104. The refocused image generator 102, the non-focus degree calculator 103, and the blurring processor 104 may be configured by cooperative hardware, or some or all thereof may be configured by a program operating on a CPU (Central Processing Unit).

The acquisition unit 101 acquires a plurality of unit images in which points on an object are imaged at different positions according to distances between the acquisition unit 101 and the positions of the points on the object.

Figure 2:
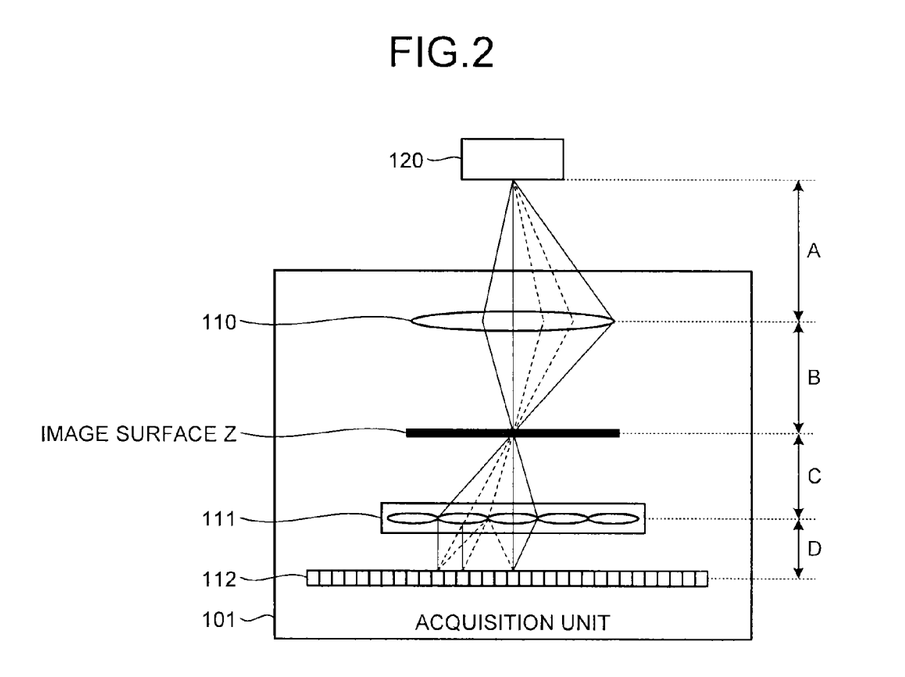
FIG. 2 is a diagram schematically illustrating an example of the configuration of an acquisition unit according to the first embodiment.

FIG. 2 is a diagram schematically illustrating an example of the configuration of the acquisition unit 101 according to the first embodiment. In the example of FIG. 2, the acquisition unit 101 includes a main lens 110 that serves as an imaging optical system and images light from an object 120 and a microlens array 111 in which a plurality of microlenses are arrayed at a predetermined pitch. The acquisition unit 101 further includes a sensor 112 that converts the light imaged by the respective microlenses of the microlens array 111 into an electric signal and outputs the electric signal. In the example of FIG. 2, the main lens 110 is set such that an image formation surface of the main lens 110 is located between the main lens 110 and the microlens array 111 (in an image surface Z).

Although not illustrated, the acquisition unit 101 further includes a sensor driving unit that drives a sensor. Driving of the sensor driving unit is controlled according to a control signal from the outside.

The sensor 112 converts the light received on the light reception surface into an electric signal and outputs the electric signal. For example, a CCD (Charge Coupled Device) image sensor or a CMOS (Complementary Metal Oxide Semiconductor) image sensor can be used as the sensor 112. In such an image sensor, light-receiving elements corresponding to respective pixels are configured to be arrayed in a matrix form on the light reception surface. Thus, the light is converted into the electric signal of each pixel through photoelectric conversion of each light-receiving element and the electric signal is output.

The acquisition unit 101 causes the sensor 112 to receive light incident on a position on the microlens array 111 from a given position on the main lens 110 and outputs an image signal including a pixel signal of each pixel. An imaging device having the same configuration as the acquisition unit 101 is known as the name of a light-field camera or a plenoptic camera.

Figure 3:
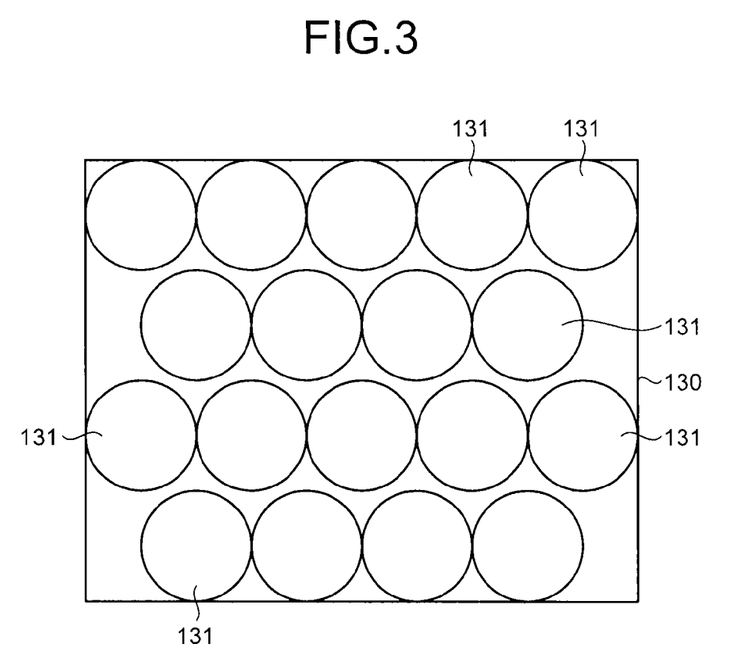
FIG. 3 is a schematic diagram illustrating an example of an image acquired by the acquisition unit according to the first embodiment.

FIG. 3 is a diagram schematically illustrating an example of an image captured and acquired by the acquisition unit 101. The acquisition unit 101 acquires an image 130 in which images 131, 131, . . . formed on the light reception surface of the sensor 112 by the respective microlenses of the microlens array 111 are arrayed in correspondence with the array of the microlenses. The image 130 in which the images 131 are disposed according to the array of the respective microlenses of the microlens array 111 is referred to as a compound eye image 130 below. The images 131, 131, are unit images which serve as units forming the compound eye image 130.

The images 131 formed by each microlens are preferably formed on the sensor 112 without overlap. Since each image 131 in the compound eye image 130 captured by the optical system exemplified in FIG. 3 is a real image, an image obtained by extracting each image 131 and inversing the extracted image 131 to the right, left, upper, and lower sides is referred to as a microlens image 131. The description will be made below using the microlens image as the unit image. That is, an image formed by one microlens is the microlens image 131, and an image in which the plurality of microlens images 131 are arrayed is the compound eye image 130.

In the configuration of FIG. 2, the light from the object 120 is imaged as the respective microlens images 131 such that the entire or partial region of the object 120 is slightly shifted according to the positions of the respective microlenses. That is, the acquisition unit 101 acquires two or more microlens images 131 imaged in a state in which the points of interest on the object 120 imaged commonly by two or more microlenses are shifted according to distances up to the respective points of interest of the two or more microlenses. In other words, the acquisition unit 101 acquires the plurality of microlens images 131 in which the points of interest are imaged at different positions according to the distances from the plurality of microlenses.

The example has been described above in which the image formation surface of the main lens 110 in the acquisition unit 101 is located between the main lens 110 and the microlens array 111, but the embodiment is not limited to this example. For example, the image formation surface of the main lens 110 may be set on the microlens array 111 or may be set located on the rear side of the sensor 112. When image formation surface of the main lens 110 is located on the rear side of the sensor 112, the microlens image 131 formed in the sensor 112 is a virtual image.

The example has been described above in which the acquisition unit 101 uses the microlens array 111 in which the plurality of microlenses are arrayed, but the invention is not limited to this example. For example, the acquisition unit 101 may use a camera array in which a plurality of cameras are arrayed. When the microlens array is used, one sensor is generally used. On the other hand, when the camera array is used, each of the cameras forming the camera array includes one sensor. A shrinkage ratio of an image by the microlens corresponds to a shrinkage ratio of a lens of the camera of the camera array. A pitch between the microlenses corresponds to a distance between the cameras of the camera array. When the camera array is used, an image captured by each camera is a unit image and an output image of the entire camera array is a compound eye image.

Referring back to FIG. 1, the refocused image generator 102 generates, from the compound eye image 130 acquired by the acquisition unit 101, a refocused image focused on the object at a designated distance from the acquisition unit 101 (the main lens 110). The blurring processor 104 performs blurring processing on the refocused image output from the refocused image generator 102 with a blur intensity corresponding to the degree of focus of each pixel of the refocused image. The refocused image subjected to the blurring processing by the blurring processor 104 is output as an output image from the image processing device 100.

The blurring processing performed by the blurring processor 104 is performed more specifically as follows. The non-focus degree calculator 103 calculates, from the compound eye image 130 acquired by the acquisition unit 101, the degree of non-focus indicating the degree of defocus for each pixel of the refocused image. In this case, the degree of non-focus is calculated so as to indicate a larger value when focus is further deviated (the degree of focus is lower). The blurring processor 104 performs the above-described blurring processing on the refocused image output from the refocused image generator 102 based on the degree of non-focus. The refocused image subjected to the blurring processing by the blurring processor 104 is output as an output image from the image processing device 100.

Figure 4:
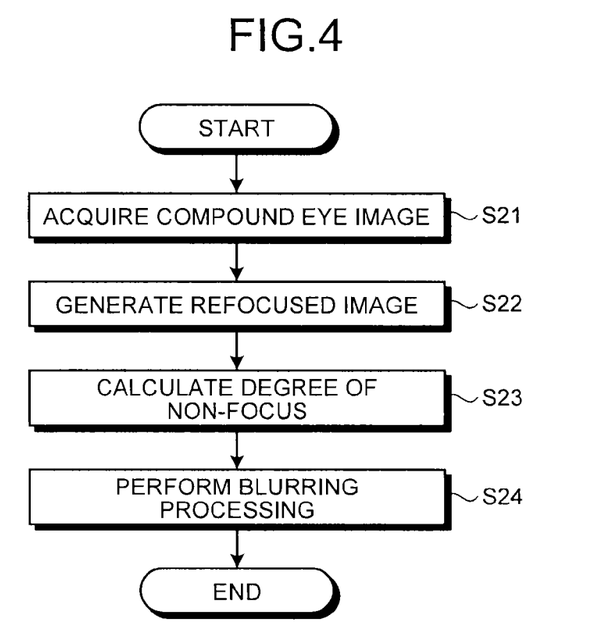
FIG. 4 is a flowchart illustrating an example of an operation performed by the image processing device according to the first embodiment.

FIG. 4 is a flowchart illustrating an example of an operation performed by the image processing device 100 according to the first embodiment. First, in step S21, the acquisition unit 101 acquires the compound eye image 130. The acquired compound eye image 130 is supplied to the refocused image generator 102 and the non-focus degree calculator 103. Next, in step S22, the refocused image generator 102 generates, from the compound eye image 130 supplied from the acquisition unit 101 in step S21, the refocused image in which a focus position is changed. Next, in step S23, the non-focus degree calculator 103 calculates, from the compound eye image 130 supplied from the acquisition unit 101 in step S21, the degree of non-focus for each pixel of the refocused image. In step S24, the blurring processor 104 performs the blurring processing on the refocused image generated in step S22 based on the degree of non-focus calculated in step S23.

The operation of generating the refocused image in step S22 will be described. In step S22, the refocused image generator 102 generates, from the compound eye image 130 supplied from the acquisition unit 101, the refocused image focused at a predetermined distance along the direction from the acquisition unit 101 (the main lens 110) to the object 120. The predetermined distance may be a distance determined in advance or may be designated by a user through a user's input or the like on an input unit (not illustrated). The refocused image generator 102 generates the refocused image by expanding and superimposing the unit images at an expansion magnification corresponding to the distance to be focused at.

Figure 5:
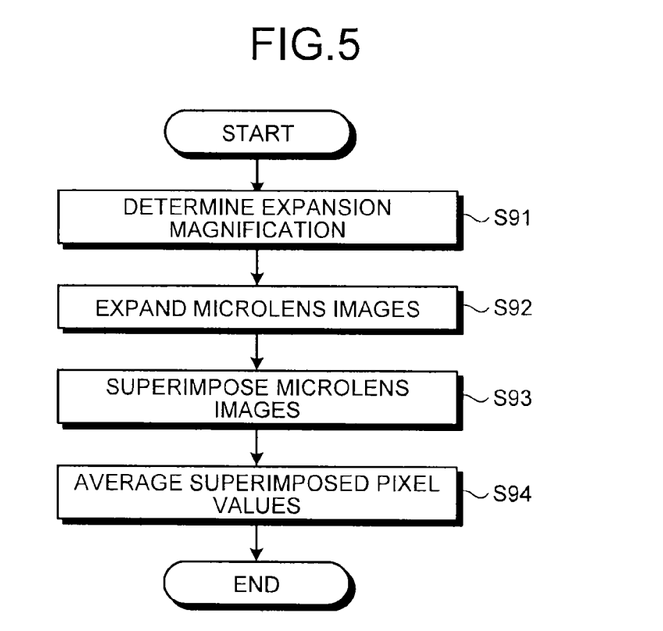
FIG. 5 is a flowchart illustrating an example of an operation of generating a refocused image according to the first embodiment.

FIG. 5 is a flowchart illustrating an example of an operation of generating the refocused image performed by the refocused image generator 102. Before the description of FIG. 5, a relation between the a distance to be focused at and an expansion magnification of the microlens image 131 which is the unit image will be described with reference to FIG. 2. The image surface Z indicates an image surface of an image to be generated through a refocus operation. A distance A indicates a distance between the object 120 desired to be focused on and the main lens 110. A distance B indicates a distance between the main lens 110 and the image surface Z. A distance C indicates a distance between the image surface Z and the microlens array 111. A distance D indicates a distance between the microlens array 111 and the sensor 112. An image of the object 120 for which a distance from the main lens 110 is the distance A is assumed to be formed on the image surface Z.

An image on the image surface Z may be generated by expanding the microlens images 131 C/D times, and superimposing them while being shifted by an amount corresponding to the pitch between the microlenses. At this time, the distance A and the distance B have a one-to-one correspondence relation from a property of a lens. Therefore, when "the distance B+the distance C" is set to a fixed distance K, the distance A and the distance C have a one-to-one correspondence relation. Thus, by performing inverse operation from the distance A so as to determine the value of the distance C, an expansion magnification m of the microlens image 131 can be determined.

Referring back to the flowchart of FIG. 5, the description will be made. In step S91, the refocused image generator 102 calculates the expansion magnification m determined by the distance A to be focused at, as described above.

Next, in step S92, the refocused image generator 102 expands each microlens image 131 at the expansion magnification m calculated in step S91. A method of expanding the microlens image 131 is not particularly limited. For example, a general image expansion method such as bilinear interpolation or a cubic convolution interpolation method can be applied. An image obtained by expanding an i-th microlens image 131 is assumed to be a microlens image $M_i$.

Figure 6:
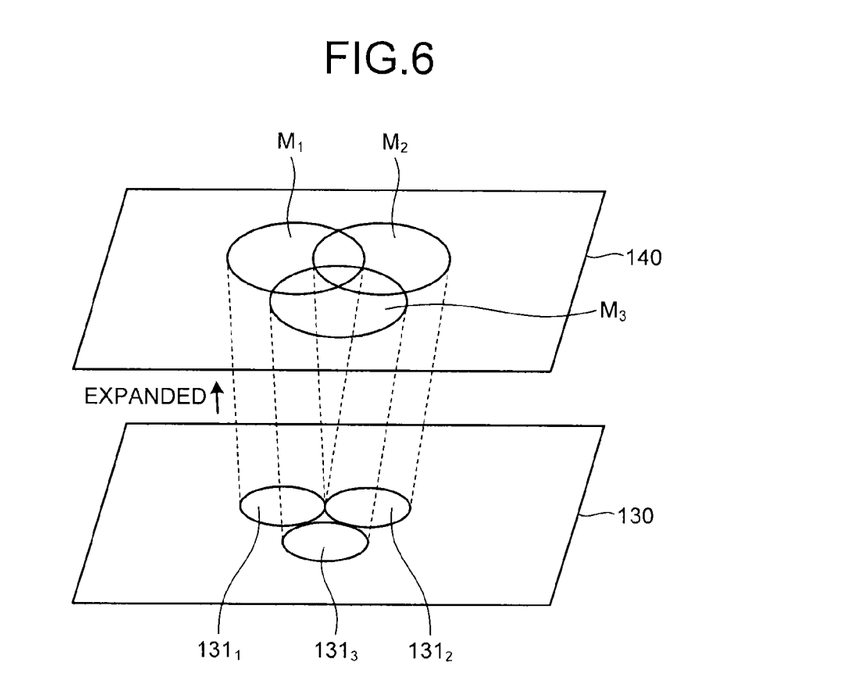
FIG. 6 is a schematic diagram illustrating an expanded form of each microlens image according to the first embodiment.

FIG. 6 is a diagram schematically illustrating a case in which each microlens image 131 is expanded at the expansion magnification m. In the example of FIG. 6, microlens images $131_1$, $131_2$, and $131_3$ captured by three adjacent microlenses are each expanded at the expansion magnification m. Superimposed portions are produced between expanded microlens images $M_1$, $M_2$, and $M_3$.

Next, in step S93, the refocused image generator 102 superimposes, for each pixel, the microlens images $M_i$ expanded in step S92 by shifting the microlens images $M_i$ by a difference between the central coordinates $o_i$ of the microlenses that form the microlens images $M_i$. Next, in step S94, the refocused image generator 102 calculates the average pixel value of the pixels whose superimposed positions accord with each other, and then generates a refocused image 140 (see FIG. 6) by using those average pixel value as a pixel value thereof.

The pixel value of a refocused image I can be calculated using the central coordinates $o_i$ of the i-th microlens image $M_i$ on the sensor 112 by using Equation (1) below. In Equation (1), it is assumed that W(x) is a set of the numbers i of the microlens images $M_i$ superimposed at coordinates x and a sign $|\cdot|$ indicates the number of elements of the set.

$$I(x) = \frac{1}{|W(x)|} \sum_{i \in W(x)} M_i(x - o_i) \quad (1)$$

Figure 7:
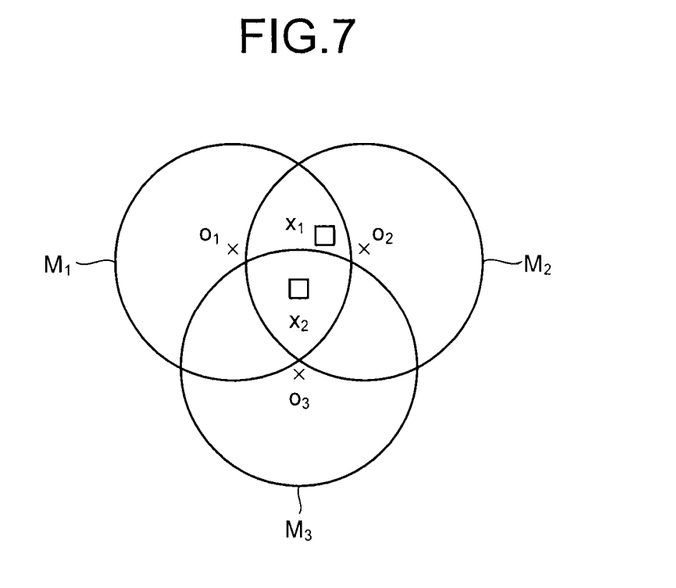
FIG. 7 is a diagram illustrating generation of the refocused image according to the first embodiment.

The generation of the refocused image 140 will be described in detail with reference to FIG. 7. For example, as exemplified in FIG. 7, the superimposed portions of the expanded microlens images $M_1$, $M_2$, and $M_3$, which are disposed about the central coordinates $o_1$, $o_2$, and $o_3$ of the microlens images $131_1$, $131_2$, and $131_3$ on the sensor 112 (see FIG. 6), respectively, are produced on the image surface Z.

In this case, for example, a pixel value at coordinates $x_1$ of a superimposed portion of the expanded microlens images $M_1$ and $M_2$ can be calculated by averaging the pixel values positioned at the coordinates $x_1$ when the expanded microlens images $M_1$ and $M_2$ are superimposed. Likewise, a pixel value at coordinates $x_2$ of a superimposed portion of the expanded microlens images $M_1$, $M_2$, and $M_3$ can be calculated by averaging corresponding pixel values in the expanded microlens images $M_1$, $M_2$, and $M_3$.

The size of the refocused image 140 can be freely set. When the size of the refocused image 140 is set to $1/\alpha$ of the resolution of the sensor 112, the refocused image generator 102 may perform the refocus processing using a value obtained by multiplying the expansion magnification by $1/\alpha$ and a value obtained by each central coordinates $o_i$ by $1/\alpha$.

Alternatively, the refocused image 140 may be generated by changing an amount of shift of the unit image without expanding each microlens image 131. At this case, the refocused image 140 may be generated by Equation (1) using, as the amount of shift, a value obtained by multiplying each central coordinates $o_i$ by $1/m$ based on the above-described expansion magnification m.

In the case where the distance A is set later by a user, the expansion magnification m may be directly set instead of setting the distance A. In this case, the user can repeatedly change the setting of the expansion magnification m until the object to be focused on is focused on, while checking the refocused image 140 according to the set expansion magnification m.

Even when the compound eye image captured by the camera array is processed, the refocused image 140 can be generated by calculating an average pixel value of superimposed pixels obtained by shifting and superimposing the unit images using, as the amount of shift, an amount of parallax between the cameras which is determined according to the focused distance A.

The operation of calculating the degree of non-focus in step S23 of the flowchart of FIG. 4 will be described. The non-focus degree calculator 103 calculates the degree of non-focus indicating lowness of the degree of focus for each pixel of the refocused image 140. More specifically, a value of the degree of non-focus is larger, as the focus is less achieved, that is, the degree of focus is lower.

The non-focus degree calculator 103 calculates a variation in the pixel values of the pixels whose positions accord with each other in the superimposed portions where the expanded microlens images $M_i$ expanded from the unit images (microlens images 131) are superimposed. Then, the non-focus degree calculator 103 calculates the degree of non-focus such that the value of the degree of non-focus is larger as the variation in the calculated pixel values is larger.

Figure 8:
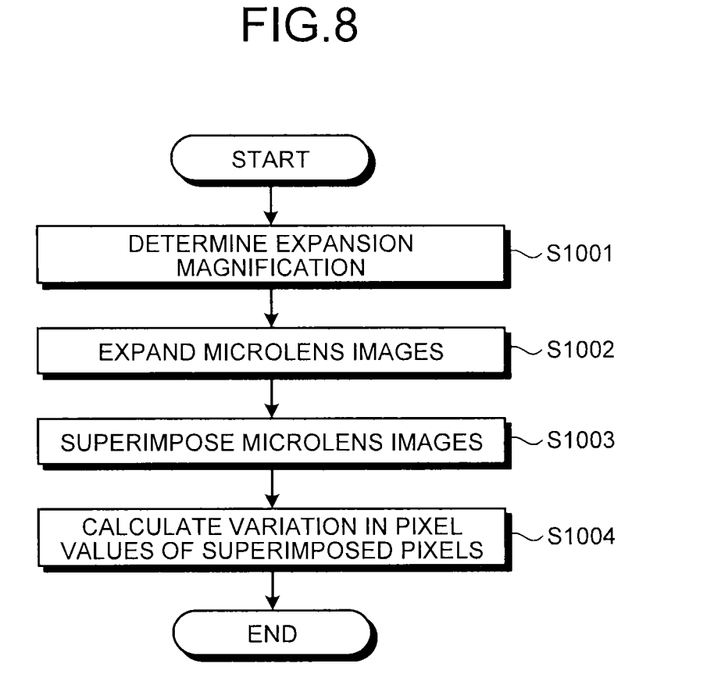
FIG. 8 is a flowchart illustrating an example of an operation of calculating the degree of non-focus according to the first embodiment.

FIG. 8 is a flowchart illustrating an example of an operation of calculating the degree of non-focus J performed in the non-focus degree calculator 103. In step S1001 to step S1003, the non-focus degree calculator 103 expands the microlens images 131 using the same expansion magnification m as that of the above-described process performed by the refocused image generator 102 and the central coordinates $o_i$ of the microlenses and superimposes the expanded microlens images $M_i$. Since the processing from step S1001 to step S1003 is the same as the processing from step S91 to step S93 performed by the refocused image generator 102, as described with reference to FIG. 5, the detailed description thereof will not be repeated here.

After the non-focus degree calculator 103 superimposes the microlens images Mi, in step S1004, the non-focus degree calculator 103 subsequently calculates a variation in the pixel values of the pixels whose positions accord with each other when superimposed. For example, in regard to the variation, a variance of the pixel values of the pixels in the microlens images Mi whose positions accord with each other when superimposed is calculated as the degree of non-focus J by Equation (2).

$$J(x) = \frac{1}{|W(x)|} \sum_{i \in W(x)} (M_i(x - o_i) - I(x))^2 \qquad (2)$$

The calculation of the degree of non-focus J is not limited to the method using the variance of Equation (2). For example, an average value of differences from the average pixel values of the pixels whose positions accord with each other when superimposed, which is expressed by Equation (3), may be calculated as the degree of non-focus J.

$$J(x) = \frac{1}{|W(x)|} \sum_{i \in W(x)} |M_i(x - o_i) - I(x)| \qquad (3)$$

With regard to a region of the microlens image 131 in which the focused object is imaged, the images are expanded, shifted, and superimposed so as to accord with each other. Thus, the variation in the pixel values of the pixels of the superimposed portion of the microlens images Mi, whose positions accord with each other when superimposed, is small. Therefore, the value of the degree of non-focus J calculated by using Equation (2) or Equation (3) described above becomes small. On the other hand, with regard to a region in which the non-focused object is imaged, even when the expanded microlens images $M_i$ are superimposed, the images do not accord with each other. Therefore, since the variation in pixel values becomes larger, the value of the degree of non-focus J calculated by using Equation (2) or Equation (3) becomes larger.

Figure 9:
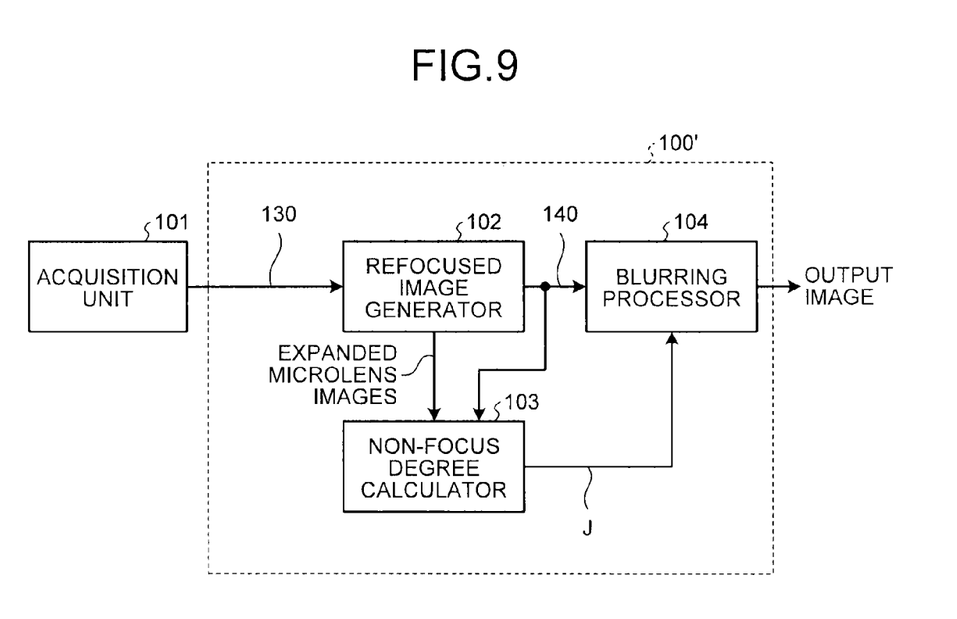
FIG. 9 is a block diagram illustrating another example of the configuration of the image processing device according to the first embodiment.

The example has been described above in which the non-focus degree calculator 103 calculates the degree of non-focus J by generating the refocused image 140 as in the refocused image generator 102, but the invention is not limited to this example. That is, the non-focus degree calculator 103 may receive an input of information regarding a processing procedure of the refocused image generator 102 and calculate the degree of non-focus J. For example, as an image processing device 100' is exemplified in FIG. 9, the non-focus degree calculator 103 may acquire the expanded microlens images $M_i$ generated in the processing procedure performed by the refocused image generator 102 and calculate the degree of non-focus J using the microlens images $M_i$.

In the case where the degree of non-focus J is calculated from the compound eye image 130 captured and acquired by the camera array, a variation in the pixel values of the images obtained by shifting the unit images by an amount of shift corresponding to an amount shifted by the refocused image generator 102 and superimposing the unit images is calculated.

The method of calculating the degree of non-focus is not limited to the above-described method. For example, distance information indicating a distance between an object and the acquisition unit 101 (the main lens 110) may be acquired separately and the degree of non-focus J may be obtained based on the distance information. In this case, the acquired distance information is calculated such that the distance thus acquired is further apart from a distance that has been focused at by the refocused image generator 102, the degree of non-focus J is larger. The distance information can be calculated from information separately measured by a distance sensor or a stereo camera. Further, the distance information may be acquired by calculating the amount of shift of the unit image in the compound eye image.

Next, the blurring processing of step S24 in the flowchart of FIG. 4 will be described. The blurring processor 104 performs the blurring processing on the refocused image 140 generated in step S22 by the refocused image generator 102 based on the degree of non-focus J calculated in step S23 by the non-focus degree calculator 103.

Figure 10:
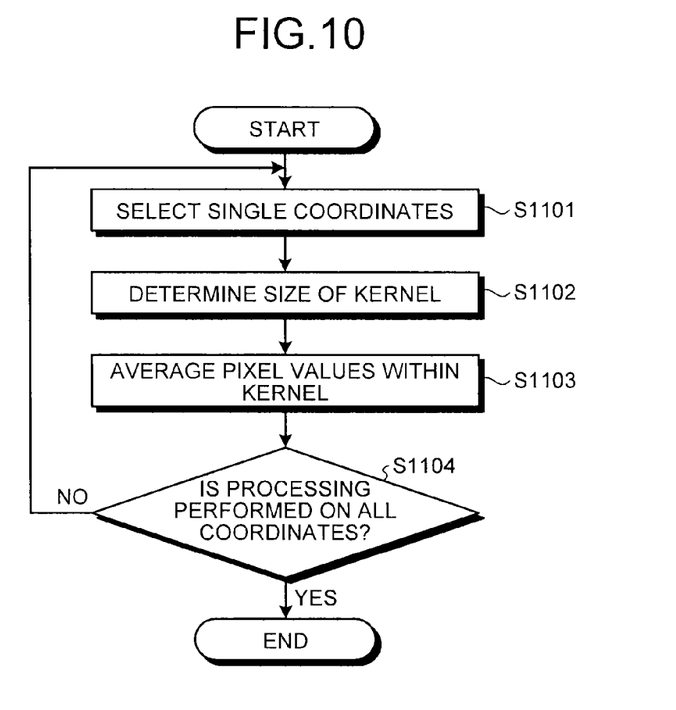
FIG. 10 is a flowchart illustrating an example of blurring processing according to the first embodiment.

FIG. 10 is a flowchart illustrating an example of the blurring processing performed by the blurring processor 104. In step S1101, the blurring processor 104 selects single coordinates $x_p$ on the refocused image 140 supplied from the refocused image generator 102 as the coordinates of a pixel of interest. Next, in step S1102, the blurring processor 104 determines the size of a kernel used to calculate the pixel value on an output image according to the degree of non-focus $J(x_p)$ of the coordinates $x_p$. The kernel is an image range in which a filtering processing is performed on single coordinates (pixel of interest) at the time when an image is blurred through the filtering processing. That is, the kernel can be said to be a range containing neighboring pixels located near the pixel of interest.

For example, the blurring processor 104 enlarges the size of the kernel as the degree of non-focus $J(x_p)$ of the coordinates $x_p$ is larger. On the assumption that $k(x_p)$ is the size of the kernel at the coordinates $x_p$, a size $k(k_p)$ of the kernel is calculated by Equation (4) below. In Equation (4), a value $\alpha$ is a positive integer.

$$k(x_p) = \alpha J(x_p) \qquad (4)$$

Figure 11:
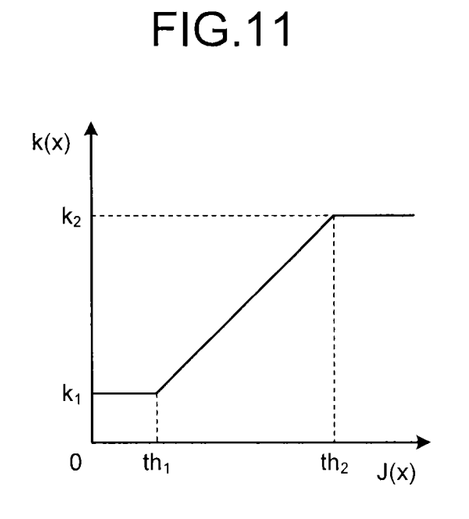
FIG. 11 is a diagram illustrating an example in which upper and lower limit values are set for the size of a kernel according to the first embodiment.

The blurring processor 104 may set the upper and lower limit values of the size $k(x_p)$ of the kernel. FIG. 11 is a diagram illustrating an example in which the upper and lower limit values are set in the size $k(x_p)$ of the kernel. The blurring processor 104 calculates the size $k(x_p)$ of the kernel from the degree of non-focus $J(x_p)$ according to a relation illustrated in FIG. 11.

More specifically, the blurring processor 104 sets the size $k(x_p)$ of the kernel to a value $k_1$, when the value of the degree of non-focus $J(x_p)$ is in the range from 0 to the lower limit value $th_1$. The blurring processor 104 sets the size $k(x_p)$ of the kernel so as to gradually increase from the value $k_1$ to a value $k_2$ according to the value of the degree of non-focus $J(x_p)$, when the value of the degree of non-focus $J(x_p)$ is in the range of the lower limit value $th_1$ to the upper limit value $th_2$. The blurring processor 104 sets the value of the size $k(x_p)$ of the kernel to the upper limit value $k_2$, when the value of the degree of non-focus $J(x_p)$ exceeds the upper limit value $th_2$.

A relation between the degree of non-focus $J(x_p)$ and the size $k(x_p)$ of the kernel may be obtained through calculation, as illustrated in FIG. 11, or may be prepared in advance as a table.

When the value of the size $k(x_p)$ of the kernel is quantized so that an odd integer is equal to or greater than 1, the calculation of subsequent step S1103 can be preferably simplified.

The example has been described above in which the size $k(x_p)$ of the kernel is determined only based on the degree of non-focus $J(x_p)$ at single coordinates $x_p$, but the invention is not limited to this example. For example, when the size $k(x_p)$ of the kernel is determined using the value of the degree of non-focus J of the coordinates near the coordinates $x_p$, artifact of the refocused image 140 can preferably be reduced more efficiently.

For example, the degree of non-focus J of each coordinate of a rectangular region in a range of ±b pixels set in the horizontal and vertical directions centering on the coordinates $x_p$ is obtained, the maximum value of each of the calculated degrees of non-focus J is obtained, and the maximum value is set as the degree of non-focus $J'(x_p)$. The size $k(x_p)$ of the kernel may be calculated using the degree of non-focus $J'(x_p)$, instead of the degree of non-focus $J(x_p)$ in Equation (4) described above. For example, the size $k(x_p)$ of the kernel is calculated by Equation (5) below.

$$k(x_p) = \alpha J'(x_p) \quad (5)$$

The method of calculating the above-described degree of non-focus $J'(x_p)$ is not limited to the method in Equation (5). For example, the size $k(x_p)$ of the kernel can also be calculated using an average value of the degrees of non-focus J of the coordinates of the rectangular region in the range of ±b pixels set in the horizontal and vertical directions centering on the coordinates $x_p$.

Next, in step S1103, the blurring processor 104 calculates a pixel value $I'(x_p)$ of an output image at the coordinates $x_p$ by Equation (6) below using the size $k(x_p)$ of the kernel obtained in step S1102.

$$I'(x_p) = \frac{1}{k(x_p)^2} \sum_{x \in Y(x_p)} I(x) \quad (6)$$

In Equation (6), it is assumed that $Y(x_p)$ is a set of the coordinates within the rectangular region of which lengths in the horizontal and vertical directions centering on the coordinates $x_p$ are the size $k(x_p)$ of the kernel. A pixel value $I(x)$ indicates the pixel value of each pixel within the kernel. An average value of the pixel values within the rectangular region is set as the pixel value $I'(x_p)$. The pixel value $I'(x_p)$ is a pixel value obtained by performing the blurring processing on the pixels of the refocused image 140 supplied from the refocused image generator 102.

The blurring processing performed by the blurring processor 104 is not limited to the above-described method. For example, a pixel value $I''(x_p)$ obtained by performing the blurring processing on the pixel having the pixel value $I(x_p)$ can also be calculated using a Gaussian kernel determining a variance by the value of the size $k(x_p)$ of the kernel.

The example has been described above in which the blurring processing is performed sequentially on the pixel values of the respective coordinates within the refocused image 140, but the embodiment is not limited to this example. For example, a map of the degree of non-focus J may be generated for the refocused image 140 and the blurring processing may be performed based on this map.

Figure 12:
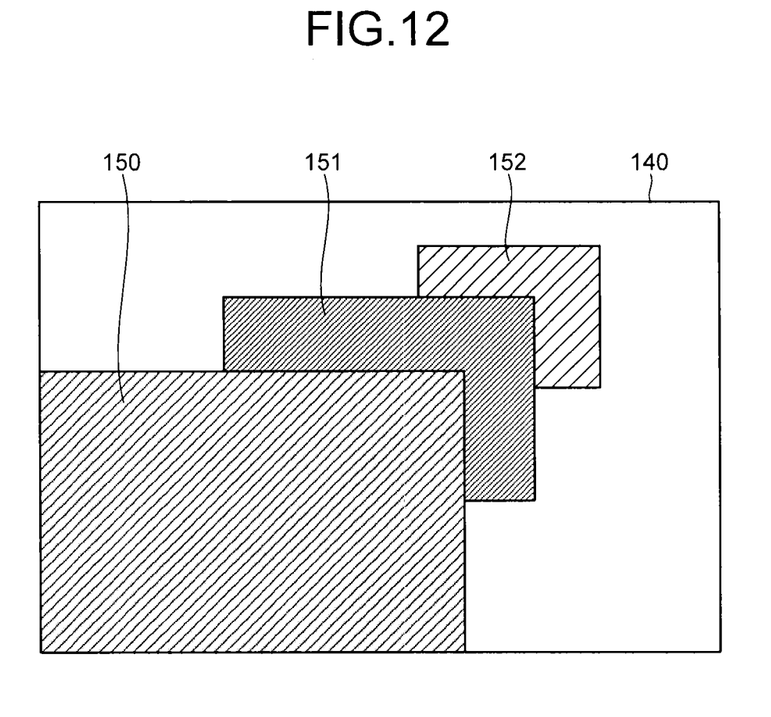
FIG. 12 is a diagram illustrating an example of a map of the degree of non-focus according to the first embodiment.

FIG. 12 is a diagram illustrating an example of the map of the degree of non-focus J. In FIG. 12, as the value of the degree of non-focus J decreases, denser hatching is given and illustrated. In the example of FIG. 12, the refocused image 140 includes images 150, 151, and 152 of three objects whose distances from the acquisition unit 101 (the main lens 110) are different from each other. The object of the image 150 is the closest to the acquisition unit 101 and the object of the image 152 is the remotest from the acquisition unit 101.

The refocused image 140 is assumed to be generated to be focused on the object (the image 151) located at a middle distance among the objects of the images 150, 151, and 152. Accordingly, in the refocused image 140, the degree of non-focus J is a small value at coordinates included in the image 151. In the example of FIG. 12, the degree of non-focus J is the second small value at coordinates included in the image 150 and is the third small value at coordinates included in the image 152. In the example of FIG. 12, in the refocused image 140, the degree of non-focus J is a larger value in a region other than the images 150, 151, and 152 than in the images 150, 151, and 152.

The blurring processor 104 performs the blurring processing on the refocused image using a map obtained by performing a filtering processing on the map of the degree of non-focus J. For example, a dilation filtering processing can be used as the filtering processing. The invention is not limited to this configuration. A filtering processing using a general blurring processing filter (an average value filter or the like) may be performed on this map.

Next, in step S1104, the blurring processor 104 determines whether the processing of step S1101 to step S1103 is performed on all of the coordinates in the refocused image 140 supplied from the refocused image generator 102. When the blurring processor 104 determines the processing is not performed on all of the coordinates, the blurring processor 104 returns the process to step S1101, select single coordinates not subjected to the blurring processing in the refocused image 140, and performs the blurring processing on the selected coordinates.

Conversely, when the blurring processor 104 determines that the processing of step S1101 to step S1103 is performed on all of the coordinates in the refocused image 140, the blurring processor 104 outputs the pixel values I' of all the coordinates of the refocused image 140 as an output image subjected to the blurring processing.

Thus, the image processing device 100 according to the first embodiment is configured to blur a region with the large degree of non-focus J, that is, a non-focused region of the refocused image 140 more intensively. The image processing device 100 can perform this processing to generate the refocused image in which the artifact is suppressed.

The example has been described above in which the compound eye image 130 is acquired every time by the acquisition unit 101 and is input to the image processing device 100, but the invention is not limited to this example. For example, the acquisition unit 101 may be configured as a storage device such as a hard disk, the separately acquired compound eye image 130 may be stored and accumulated in the storage device such as a hard disk, and the compound eye image 130 stored in the storage device may be input to the image processing device 100.

Second Embodiment

Next, a second embodiment will be described. The second embodiment is an example in which the image processing device 100 according to the first embodiment includes an optical system and is applied to an imaging device capable of storing and displaying an output image.

Figure 13:
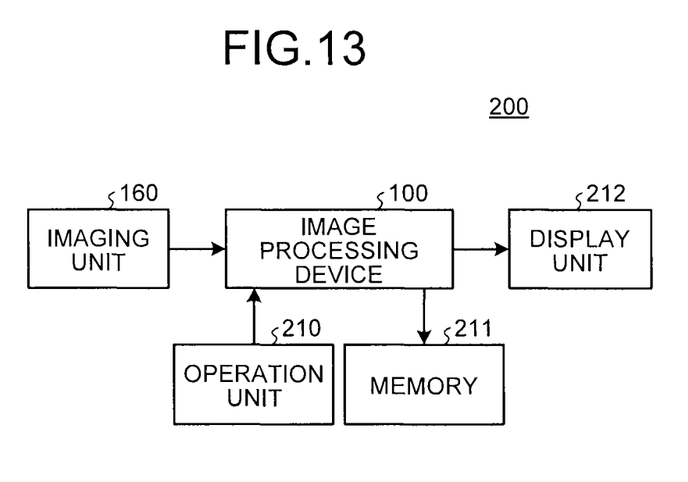
FIG. 13 is a block diagram illustrating an example of the configuration of an imaging device according to a second embodiment.

FIG. 13 is a diagram illustrating example of the configuration of an imaging device 200 according to the second embodiment. In FIG. 13, the same reference numerals are given to constituent elements common to those described above in FIG. 1 and the detailed description thereof will not be repeated. As exemplified in FIG. 13, the imaging device 200 includes an imaging unit 160, an image processing device 100, an operation unit 210, a memory 211, and a display unit 212.

The entire process of the imaging device 200 is controlled according to a program by a CPU (not illustrated). The imaging unit 160 includes the optical system exemplified in FIG. 2 and a sensor 112 in correspondence with the above-described acquisition unit 101.

The memory 211 is, for example, a non-volatile semiconductor memory and stores an output image output from the image processing device 100. The display unit 212 includes a display device such as an LCD (Liquid Crystal Display) and a driving circuit that drives the display device. The display unit 212 displays the output image output from the image processing device 100.

The operation unit 210 receives a user's input. For example, a distance that the user wants to be focused at for the refocused image 140 can be designated in the image processing device 100 through the user's input on the operation unit 210. The distance that the user wants to be focused at is, for example, has a value according to the expansion magnification m when the unit images are expanded. The operation unit 210 can receive a user's input or the like of an imaging timing of the imaging unit 160, a storage timing of the output image in the memory 211, and focusing control at the time of imaging.

In this configuration, the imaging device 200 designates the focusing distance at the time of imaging according to a user's input on the operation unit 210. The imaging device 200 designates a timing at which the compound eye image 130 output from the imaging unit 160 is acquired in the image processing device 100 according to a user's input on the operation unit 210.

The imaging device 200 causes the display unit 212 to display an output image subjected even to the blurring processing by the blurring processor 104 according to the focusing distance for the refocused image 140 designated by a user's input on the operation unit 210. For example, the user can re-input the focusing distance from the operation unit 210 with reference to display of the display unit 212. For example, when the user obtains an interesting output image, the user operates the operation unit 210 to store the output image in the memory 211.

Thus, the imaging device 200 according to the second embodiment obtains the degree of non-focus J of the refocused image 140 generated from the compound eye image 130 captured by the imaging unit 160. In a region which is not in focus and has the larger degree of non-focus J, an output image obtained by blurring the refocused image 140 more intensively is obtained. Therefore, the user can generate the refocused image in which the artifact is suppressed from the compound eye image 130 captured by the imaging device 200 and obtains the refocused image as the output image.

Third Embodiment

Next, a third embodiment will be described. The third embodiment is an example in which the image processing device 100 according to the first embodiment is applied to a sensor device that includes an optical system and is configured to transmit an output image to the outside and receive an operation signal from the outside.

Figure 14:
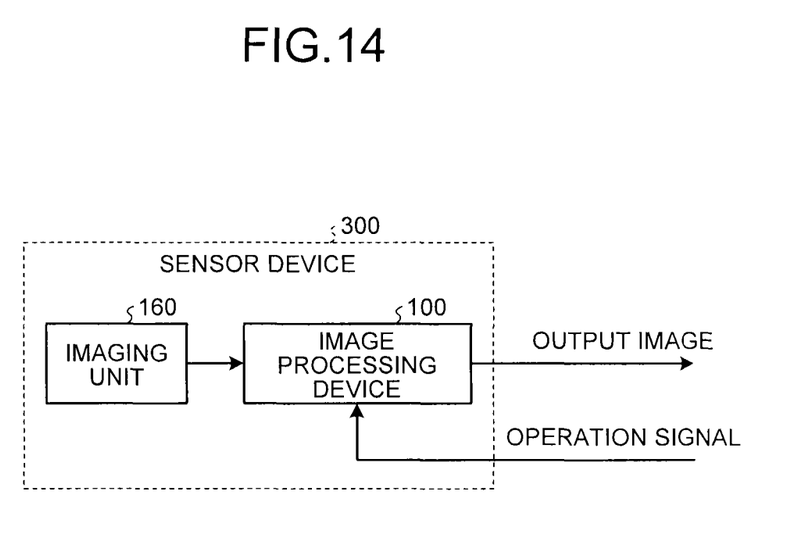
FIG. 14 is a block diagram illustrating an example of the configuration of a sensor device according to a third embodiment.

FIG. 14 is a diagram illustrating an example of the configuration of a sensor device 300 according to the third embodiment. In FIG. 14, the same reference numerals are given to constituent elements common to those described above in FIGS. 1 and 13 and the detailed description thereof will not be repeated. As exemplified in FIG. 14, the sensor device 300 includes an imaging unit 160 and an image processing device 100.

An operation signal transmitted from the outside through wired or wireless communication is received by the sensor device 300 and is input to the image processing device 100. An output image output from the image processing device 100 is output from the sensor device 300 through wired or wireless communication.

In this configuration, the sensor device 300 generates an output image subjected even to the blurring processing by the blurring processor 104 according to the focusing distance for the refocused image designated by the operation signal transmitted from the outside. The output image is transmitted from the sensor device 300 to the outside. In the outside, the received output image can be displayed and an operation signal configured to designate a focused position can also be transmitted to the sensor device 300 based on the display. A re-input from the operation unit 210 can be performed.

The sensor device 300 can be applied to, for example, a monitoring camera. In this case, display is monitored using an output image from the sensor device 300 located at a remote place. When the display image includes a doubtful image, a focusing distance for the doubtful image portion is designated and an operation signal is transmitted to the sensor device 300. The sensor device 300 regenerates the refocused image 140 in response to the operation signal, performs the blurring processing, and transmits an output image. The details of the doubtful image portion can be confirmed using the output image on which the focusing distance is reset and the artifact is suppressed.

Fourth Embodiment

Figure 15:
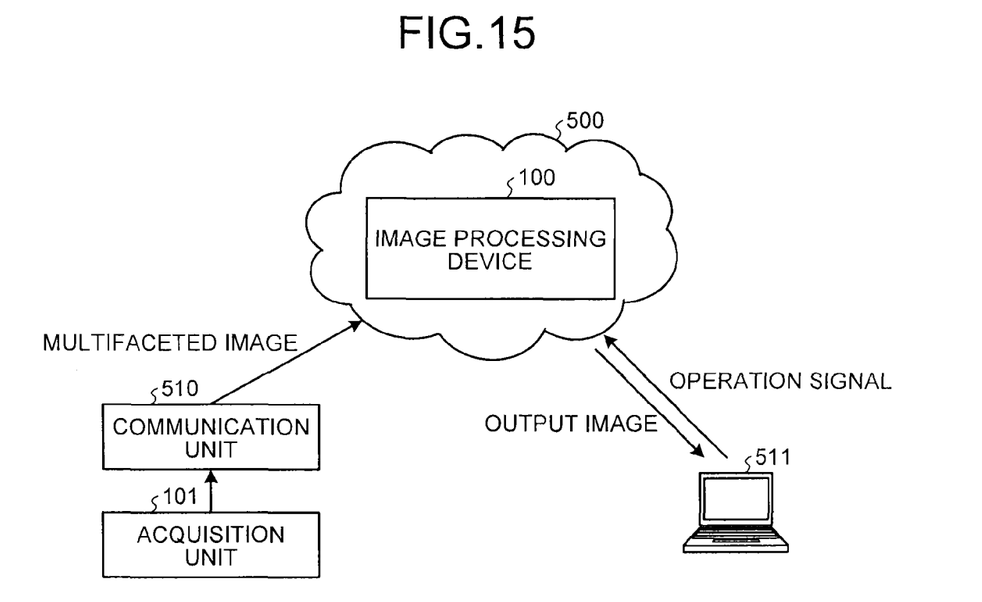
FIG. 15 is a block diagram illustrating an example of the configuration of an image processing system according to a fourth embodiment.

Next, a fourth embodiment will be described. The fourth embodiment is an example of an image processing system in which the image processing device 100 according to the first embodiment is constructed on a network cloud. FIG. 15 is a diagram illustrating an example of the configuration of the image processing system according to the fourth embodiment. In FIG. 15, the same reference numerals are given to constituent elements common to those described above in FIG. 1 and the detailed description thereof will not be repeated.

In FIG. 15, in the image processing system, the image processing device 100 is constructed on a network cloud 500. The network cloud 500 is a network group that includes a plurality of computers connected to each other in a network and displays only input and output as a black box of which the inside is hidden from the outside. The network cloud 500 is assumed to use, for example, TCP/IP (Transmission Control Protocol/Internet Protocol) as a communication protocol.

The compound eye image 130 acquired by the acquisition unit 101 is transmitted to the network cloud 500 via the communication unit 510 and is input to the image processing device 100. The compound eye image 130 transmitted via the communication unit 510 may be accumulated and stored in a server device or the like on the network cloud 500. The image processing device 100 generates the refocused image 140 based on the compound eye image 130 transmitted via the communication unit 510, calculates the degree of non-focus J and generates an output image by performing the blurring processing on the refocused image 140 based on the degree of non-focus J.

The generated output image is output from the image processing device 100 and, for example, a terminal device 511 which is a PC (Personal Computer) receives the output image from the network cloud 500. The terminal device 511 can display the received output image on a display and transmit an operation signal configured to designate a focusing distance in response to a user's input to the network cloud 500. The image processing device 100 regenerates the refocused image 140 based on the designated focusing distance in response to the operation signal and generates an output image by performing the blurring processing. The output image is retransmitted from the network cloud 500 to the terminal device 511.

According to the fourth embodiment, the user can obtain the output image which is generated by the image processing device 100 and in which the artifact is suppressed through the blurring processing, even when the user does not possess the image processing device 100.

Another Embodiment

Figure 16:
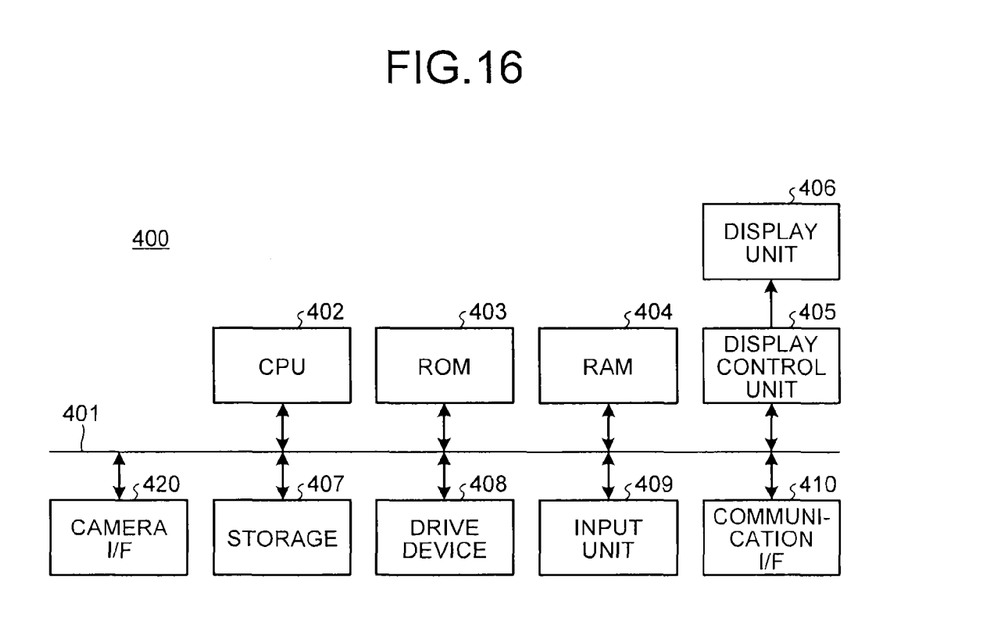
FIG. 16 is a block diagram illustrating an example of the configuration of a computer device to which the image processing device is applicable according to another embodiment.

The image processing device 100 according to the above-described embodiments may be realized using a general computer device as basic hardware. FIG. 16 is a diagram illustrating an example of the configuration of a computer device 400 to which the image processing device 100 can be applied according to another embodiment.

In the computer device 400 exemplified in FIG. 16, a CPU (Central Processing Unit) 402, a ROM (Read Only Memory) 403, a RAM (Random Access Memory) 404, and a display control unit 405 are connected to a bus 401. A storage 407, a drive device 408, an input unit 409, a communication I/F 410, and a camera I/F 420 are also connected to the bus 401. The storage 407 is a storage medium capable of storing data in a non-volatile manner and is, for example, a hard disk. The invention is not limited this configuration, but the storage 407 may be a non-volatile semiconductor memory such as a flash memory.

The CPU 402 controls the entire computer device 400 using the RAM 404 as a work memory according to programs stored in the ROM 403 and the storage 407. The display control unit 405 converts a display control signal generated by the CPU 402 into a signal which the display unit 406 can display and outputs the converted signal.

The storage 407 stores a program executed by the above-described CPU 402 or various kinds of data. A detachable recording medium (not illustrated) can be mounted on the drive device 408, and thus the drive device 408 can read and write data from and on the recording medium. Examples of the recording medium treated by the drive device 408 include a disk recording medium such as a CD (Compact Disk) or a DVD (Digital Versatile Disk) and a non-volatile semiconductor memory.

The input unit 409 inputs data from the outside. For example, the input unit 409 includes a predetermined interface such as a USB (Universal Serial Bus) or IEEE 1394 (Institute of Electrical and Electronics Engineers 1394) and inputs data from an external device through the interface. Image data of an input image can be input from the input unit 409.

An input device such as a keyboard or a mouse receiving a user's input is connected to the input unit 409. For example, a user can give an instruction to the computer device 400 by operating the input device according to display of the display unit 406. The input device receiving a user's input may be configured to be integrated with the display unit 406. At this time, the input device may be preferably configured as a touch panel that outputs a control signal according to a pressed position and transmits an image of the display unit 406.

The communication I/F 410 performs communication with an external communication network using a predetermined protocol.

The camera I/F 420 is an interface between the acquisition unit 101 and the computer device 400. The compound eye image 130 acquired by the acquisition unit 101 is received via the camera I/F 420 by the computer device 400 and is stored in, for example, the RAM 404 or the storage 407. The camera I/F 420 can supply a control signal to the acquisition unit 101 in response to a command of the CPU 402.

The refocused image generator 102, the non-focus degree calculator 103, and the blurring processor 104 described above are realized by an image processing program operating on the CPU 402. The image processing program configured to execute image processing according to the embodiments is recorded as a file of an installable format or an executable format in a computer-readable recording medium such as a CD or a DVD to be supplied. The invention is not limited to this configuration, but the image processing program may be stored in advance in the ROM 403 to be supplied.

The image processing program configured to execute the image processing according to the embodiments may be stored in a computer connected to a communication network such as the Internet and may be downloaded via the communication network to be supplied. The image processing program configured to execute the image processing according to the embodiments may be supplied or distributed via a communication network such as the Internet.

For example, the image processing program configured to execute the image processing according to the embodiments is designed to have a module structure including the above-described units (the refocused image generator 102, the non-focus degree calculator 103, and the blurring processor 104). Therefore, for example, the CPU 402 as actual hardware reads the image processing program from the storage 407 and executes the image processing program, and thus the above-described units are loaded on a main storage device (for example, the RAM 404) so that the units are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
a generator configured to generate, from a plurality of unit images in which points on an object are imaged by an imaging unit at different positions according to distances between the imaging unit and the positions of the points on the object, a refocused image focused at a predetermined distance;
a processor configured to perform blurring processing on each pixel of the refocused image according to an intensity corresponding to a focusing degree of said each pixel of the refocused image; and a calculator configured to calculate a defocusing degree indicating a larger value as the focusing degree is lower for said each pixel of the refocused image, wherein the processor is further configured to perform the blurring processing on said each pixel of the refocused image more intensively as a defocusing degree of said each pixel of the refocused image is larger, and wherein the calculator is further configured to calculate the defocusing degree with a magnitude corresponding to a variation in pixel values of pixels whose pixel positions accord with each other in the plurality of unit images that are expanded at an expansion ratio determined according to the predetermined distance and are superimposed.

2. The device according to claim 1, wherein the processor is further configured to perform the blurring processing on a pixel of interest of the refocused image with a blur intensity corresponding to a magnitude of each defocusing degree calculated for each of neighboring pixels located near the pixel of interest by calculator.

3. The device according to claim 1, wherein the processor is further configured to perform the blurring processing on a pixel of interest of the refocused image using a pixel value of a pixel within a range that is set corresponding to a magnitude of each defocusing degree calculated for each of neighboring pixels located near the pixel of interest by the calculator.

4. The device according to claim 1, wherein the processor is further configured to perform the blurring processing on a pixel of interest with a blur intensity corresponding to a magnitude of the maximum value of the defocusing degree for a pixel within a predetermined range including the pixel of interest.

5. The device according to claim 1, wherein the processor is further configured to perform the blurring processing on a pixel of interest using a pixel value of a pixel within a range that is set corresponding to a magnitude of the maximum value of the defocusing degree for a pixel within a predetermined range including the pixel of interest.

6. The device according to claim 1, wherein the variation is a variance of the pixel values of the pixels of which the pixel positions accord with each other.

7. The device according to claim 1, further comprising:
a distance acquisition unit configured to acquire a distance between the imaging unit and the object,
wherein the calculator is further configured to calculate the defocusing degree with a magnitude corresponding to a difference between the distance acquired by the distance acquisition unit and the predetermined distance.

8. An imaging device, comprising:
the image processing device according to claim 1;
the imaging unit;
a reception unit configured to receive information that indicates at least the predetermined distance and is transmitted from the outside; and
a transmission unit configured to transmit the refocused image subjected to the blurring processing by the processor to the outside.

9. An imaging device, comprising:
the image processing device according to claim 1;
the imaging unit;
an input unit configured to receive a user's input of information indicating at least the predetermined distance; and
a display unit configured to display the refocused image subjected to the blurring processing by the processor.

10. An image processing method, comprising:
generating, from a plurality of unit images in which points on an object are imaged by an imaging unit at different positions according to distances between the imaging unit and the positions of the points on the object, a refocused image focused at a predetermined distance; and
performing blurring processing on each pixel of the refocused image according to an intensity corresponding to a focusing degree of said each pixel of the refocused image; and
calculating a defocusing degree indicating a larger value as the focusing degree is lower for said each pixel of the refocused image,
wherein the performing includes performing the blurring processing on said each pixel of the refocused image more intensively as the defocusing degree of said each pixel of the refocused image is larger, and
wherein the calculating includes calculating the defocusing degree with a magnitude corresponding to a variation in pixel values of the pixels whose pixel positions accord with each other in the plurality of unit images that are expanded at an expansion ratio determined according to the predetermined distance and are superimposed.

11. A computer program product comprising a non-transitory computer-readable medium containing a computer program, which when executed, causes a computer to perform a method, comprising:
generating, from a plurality of unit images in which points on an object are imaged by an imaging unit at different positions according to distances between the imaging unit and the positions of the points on the object, a refocused image focused at a predetermined distance;
performing blurring processing on each pixel of the refocused image according to an intensity corresponding to a focusing degree of said each pixel of the refocused image; and
calculating a defocusing degree indicating a larger value as the focusing degree is lower for said each pixel of the refocused image, wherein
the performing includes performing the blurring processing on said each pixel of the refocused image more intensively as the defocusing degree of the pixel of the refocused image is larger, and
the calculating includes calculating the defocusing degree with a magnitude corresponding to a variation in pixel values of the pixels whose pixel positions accord with each other in the plurality of unit images that are expanded at an expansion ratio determined according to the predetermined distance and are superimposed.

12. An image processing device, comprising:
a generator configured to generate, from a plurality of unit images in which points on an object are imaged by an imaging unit at different positions according to distances between the imaging unit and the positions of the points on the object, a refocused image focused at a predetermined distance;
a processor configured to perform blurring processing on each pixel of the refocused image according to an intensity corresponding to a focusing degree of said each pixel of the refocused image; and
a calculator configured to calculate a defocusing degree indicating a larger value as the focusing degree is lower for said each pixel of the refocused image,
wherein the processor performs the blurring processing on said each pixel of the refocused image more intensively as the defocusing degree of said each pixel of the refocused image is larger, and wherein the calculator is further configured to calculate the defocusing degree with a magnitude corresponding to a variation in pixel values of the pixels whose pixel positions accord with each other in the unit images that are shifted by an amount of shift determined according to the predetermined distance and are superimposed.

13. The device according to claim 12, wherein the processor is further configured to perform the blurring processing on a pixel of interest of the refocused image with a blur intensity corresponding to a magnitude of each defocusing degree calculated for each of neighboring pixels located near the pixel of interest by calculator.

14. The device according to claim 12, wherein the processor is further configured to perform the blurring processing on a pixel of interest of the refocused image using a pixel value of a pixel within a range that is set corresponding to a magnitude of each defocusing degree calculated for each of neighboring pixels located near the pixel of interest by the calculator.

15. The device according to claim 12, wherein the processor is further configured to perform the blurring processing on a pixel of interest with a blur intensity corresponding to a magnitude of the maximum value of the defocusing degree for a pixel within a predetermined range including the pixel of interest.

16. The device according to claim 12, wherein the processor is further configured to perform the blurring processing on a pixel of interest using a pixel value of a pixel within a range that is set corresponding to a magnitude of the maximum value of the defocusing degree for a pixel within a predetermined range including the pixel of interest.

17. The device according to claim 12, wherein the variation is a variance of the pixel values of the pixels of which the pixel positions accord with each other.

\* \* \* \* \*